(12) United States Patent
Muramatsu et al.

(10) Patent No.: US 7,020,949 B2
(45) Date of Patent: Apr. 4, 2006

(54) METHOD OF FABRICATING HEAD SUPPORTING MEMBER

(75) Inventors: Shigeo Muramatsu, Tokyo (JP); Satoshi Yamaguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 378 days.

(21) Appl. No.: 10/067,840

(22) Filed: Feb. 8, 2002

(65) Prior Publication Data

US 2002/0124383 A1    Sep. 12, 2002

(30) Foreign Application Priority Data

Mar. 12, 2001  (JP)  ............................. 2001-069416

(51) Int. Cl.
*G11B 5/127*  (2006.01)
*G11B 5/48*   (2006.01)

(52) U.S. Cl. ............................... 29/603.04; 29/603.03; 360/244.2; 360/244.5; 360/264.2; 360/266.3

(58) Field of Classification Search ............. 29/603.03, 29/603.04, 603.01, 868, 603.06; 360/244.2, 360/244.3, 244.5, 245.5, 244.1, 264.2, 266.3; 219/121.6
See application file for complete search history.

(56) References Cited

U.S. PATENT DOCUMENTS 5,282,103 A * 1/1994 Hatch et al. ......... 360/244.3 X
5,774,305 A   6/1998 Boutaghou
6,011,239 A * 1/2000 Singh et al. ............. 219/121.6

FOREIGN PATENT DOCUMENTS

| CN | 1108418 A   |   | 9/1995  |
|----|-------------|---|---------|
| JP | 64-25315    |   | 1/1989  |
| JP | 5-159501    |   | 6/1993  |
| JP | 7-262541    |   | 10/1995 |
| JP | 8-255449    |   | 10/1996 |
| JP | 9-161251    | * | 6/1997  |
| JP | 10-198935   |   | 7/1998  |
| JP | 10-222941   |   | 8/1998  |
| JP | 11-86253    |   | 3/1999  |
| JP | 11-134627   |   | 5/1999  |
| JP | 11-238218   |   | 8/1999  |
| JP | 11-250434   |   | 9/1999  |
| JP | 2000-30233  |   | 1/2000  |

* cited by examiner

*Primary Examiner*—A. Dexter Tugbang
(74) *Attorney, Agent, or Firm*—Oblon, Spivak, McClelland, Maier & Neustadt, P.C.

(57) ABSTRACT

A fabricating method effective in affixing FPC with high accuracy, simplifying a supporting mechanism of a head supporting member, avoiding mechanical damage to a load beam or a flexible member and promoting performance of adhering FPC to the load beam. Before bending a load beam included in a head supporting member, FPC is affixed on a face of the head supporting member. Thereafter, the load beam is bent.

6 Claims, 9 Drawing Sheets

METHOD OF FABRICATING HEAD SUPPORTING MEMBER

BACKGROUND OF THE INVENTION

The present invention relates to a method of fabricating a head supporting member.

According to a float-up type magnetic disk apparatus, for many years there has been adopted a structure in which a twisted wire pair is attached to a head supporting member and the twisted wire pair is connected to a lead-out electrode (bump) of a magnetic head attached to the head supporting member by means of laser welding or the like. However, in accordance with small-sized formation of the magnetic head and a reduction in a float-up amount of the magnetic head, highly accurate weight balance is needed and therefore, a wiring integral magnetic head apparatus is desired.

Further, in recent years, there has been reduced into practice an FPC adhering type magnetic head apparatus in which wirings are separately fabricated as a flexible printed circuit board (hereinafter, referred to as FPC) and FPC is adhered to a head supporting member (suspension). The invention relates to the FPC adhering type magnetic head apparatus.

When the FPC adhering type magnetic head apparatus is fabricated, conventionally, FPC is affixed on a head supporting member supplied from a head supporting member fabricating maker. According to the head supporting member, a load beam is bent by a certain angle in order to apply load on the magnetic head and maintain a float-up amount of the magnetic head relative to a record medium such as a magnetic disk. The bending of the load beam is conventionally provided by a step referred to as gram load forming by the fabrication maker side.

The head supporting member subjected to the gram load forming is supplied from the maker to a magnetic head apparatus maker. The magnetic head apparatus maker affixes FPC on the head supporting member subjected to the gram load forming and mounts a thin film magnetic head thereto.

However, the head supporting member supplied to the magnetic head apparatus maker has already been subjected to the gram load forming and therefore, when FPC is affixed thereon, various problems are posed.

For example, when there is adopted steps of inclining the head supporter such that a face thereof for affixing FPC becomes horizontal and carrying FPC on the head supporting member while adsorbing FPC and affixing FPC thereon, there is needed a complicated mechanism such as a mechanism of inclinedly fixing the head supporting member, a mechanism of escaping FPC such that FPC does not overlap a flexible member (gimbal portion) of the head supporting member or the like and a deterioration in accuracy of affixing FPC is liable to bring about.

As other method, there is a method of flatly elongating the head supporting member subjected to the gram load forming by exerting mechanical coercive force and affixing FPC under the state. However, in this case, the head supporting member subjected to the gram load forming is elongated by exerting the mechanical coercive force and therefore, the load beam or the flexible member is mechanically damaged.

Further, when FPC is affixed on the head supporting member subjected to the gram load forming, at a bent portion of the load beam as well as its periphery, performance of adhering FPC to the load beam is deteriorated and exfoliation of FPC may be brought about.

SUMMARY OF THE INVENTION

It is an objective of the invention to provide a fabricating method capable of affixing FPC on a head supporting member with high accuracy.

It is another objective of the invention to provide a fabricating method capable of simplifying a supporting mechanism of a head supporting member when FPC is affixed thereon.

It is still another objective of the invention to provide a fabricating method capable of avoiding mechanical damage to a load beam or a flexible member.

It is still another objective of the invention to provide a fabricating method which is provided with high performance of adhering FPC to a load beam and avoids exfoliation of FPC or the like.

In order to achieve the above-described objectives, a method of fabricating a head supporting member according to the invention includes steps of affixing a flexible wiring on a face of the head supporting member before bending a load beam included in the head supporting member and successively bending the load beam.

According to the fabricating method, in affixing FPC, the head supporting member may simply be arranged horizontally. Therefore, FPC can be affixed to the head supporting member with high accuracy. Further, a supporting mechanism of the head supporting member in affixing FPC can be simplified.

Further, different from the case of using the head supporting member subjected to the gram load forming, it is not necessary to elongate the head supporting member by exerting mechanical coercive force. Therefore, mechanical damage to the load beam or the flexible member can be avoided.

Further, FPC is affixed to the flat head supporting member and therefore, performance of adhering FPC to the head supporting member is promoted and exfoliation of FPC or the like is difficult to bring about.

Preferably, there is executed a springback (return by spring) preventive treatment with respect to bending of the load beam. Thereby, an angle of bending the load beam can accurately be set to a predetermined angle.

The springback preventive treatment can include a low temperature annealing or high temperature annealing treatment which does not influence on a function of a flexible wiring. The high temperature annealing can be executed by irradiating laser.

A detailed explanation will be given of other objects, constitutions and effects of the invention in reference to attached drawings constituting embodiments.

DETAILED DESCRIPTION OF THE PREFERRED EMBODIMENTS

Figure 1:
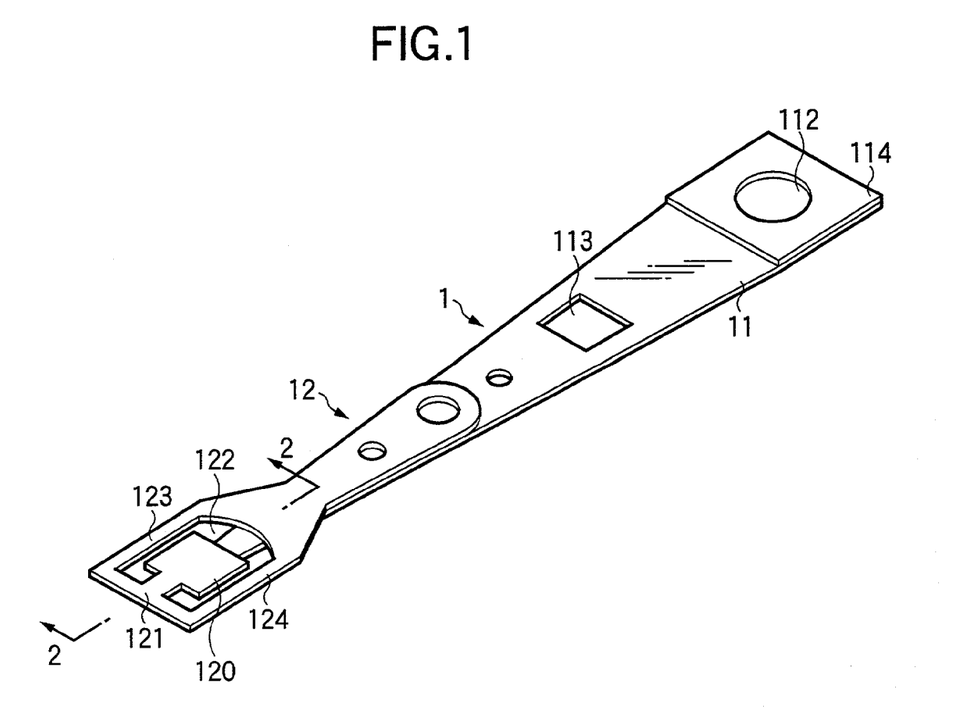
FIG. 1 is a perspective view of a head supporting member constituting an object of applying a fabricating method according to the invention.
Figure 2:
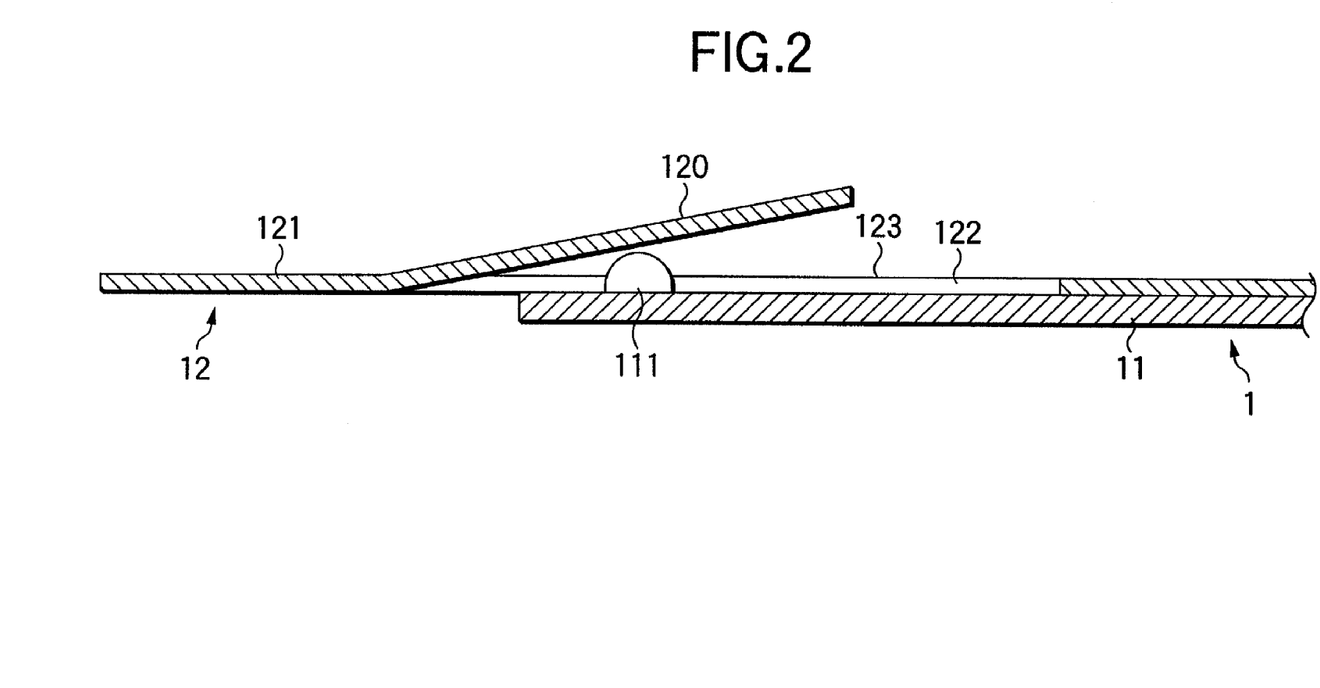
FIG. 2 is an enlarged partial sectional view taken along a line 2—2 of FIG. 1.

FIG. 1 is a perspective view of a head supporting member constituting an object of applying a fabricating method according to the invention and FIG. 2 is an enlarged partial sectional view taken along a line 2—2 of FIG. 1.

A head supporting member 1 includes a load beam 11 and a flexible member 12. The load beam 11 is formed in a shape of a flat plate over a total thereof and is not yet subjected to bending related to a pitch angle. The head supporting member 1 is supplied from a head supporting member fabricating maker in such a state of the flat plate shape.

The load beam 11 is provided with a projected portion 111 (refer to FIG. 2) at a vicinity of a free end on an axis line in a longitudinal direction passing a center thereof. The load beam 11 is provided with a base portion 114 at an end portion thereof on a side opposed to the projected portion 111 (refer to FIG. 2) and is provided with a positioning hole 112 substantially at a central portion of the base portion 114. Further, the load beam 11 is provided with a hole 113 such as a square hole for adjusting load. However, the load beam 11 can be constituted by various structures and shapes and is not limited to the illustrated embodiment.

The flexible member 12 is constituted by a thin spring plate member and one face thereof is attached to a face of the load beam 11 on a side having the projected portion 111 and is applied with press load from the projected portion 111. The flexible member 12 is affixed together with the side of the load beam 11 having the projected portion 111 by means of calking or the like. In place of calking, means such as spot welding or the like may be used.

Further, the flexible member 12 is provided with a tongue-like portion 120 constituting a head attaching portion. One end of the tongue-like portion 120 is coupled to a transverse frame portion 121 of the flexible member 12. Both ends of the transverse frame portion 121 of the flexible member 12 are connected to outer frame portions 123 and 124. Grooves 122 are formed between the outer frame portions 123 and 124 and the tongue-like portion 120. A front end of the projected portion 111 is brought into contact with other face of the tongue-like portion 120, thereby, the tongue-like portion 120 is provided with two degrees of freedom around two orthogonal axes, that is, the two degrees of freedom of pitching and rolling.

According to the invention, before bending the load beam 11 included in the head supporting member 1 illustrated in FIG. 1 and FIG. 2, FPC3 is affixed on a face of the head supporting member 1 and thereafter, the load beam 11 is bent. Next, a specific explanation will be given thereof in reference to the drawings.

Figure 3:
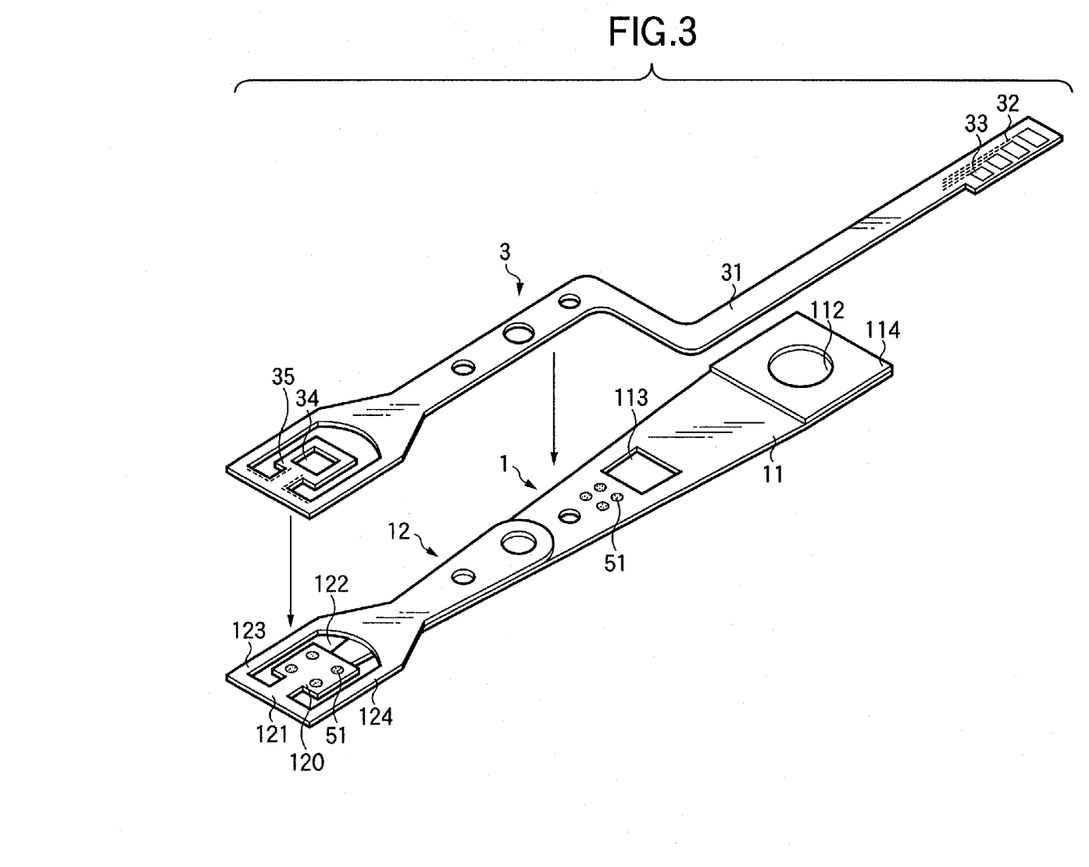
FIG. 3 is a perspective view showing a step of affixing FPC to the head supporting member shown in FIG. 1 and FIG. 2.
Figure 4:
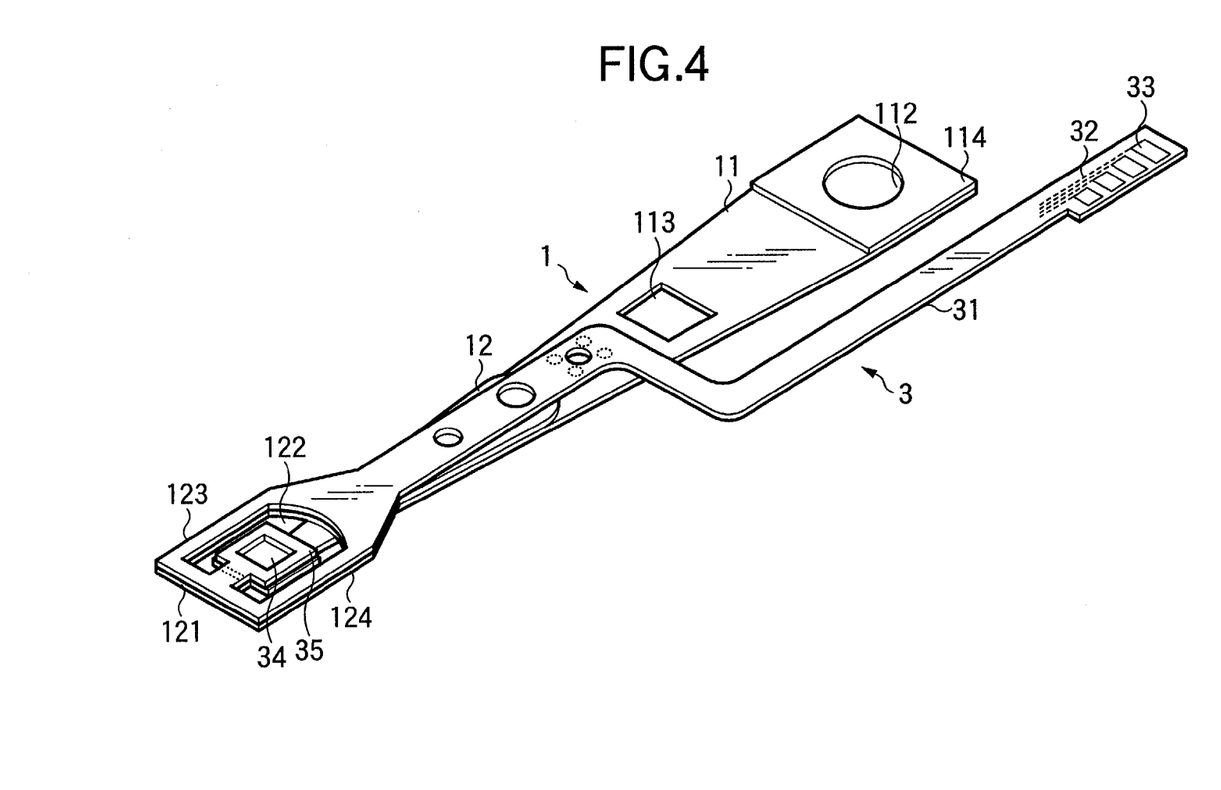
FIG. 4 is a perspective view of the head supporting member after having been affixed with FPC.
Figure 5:
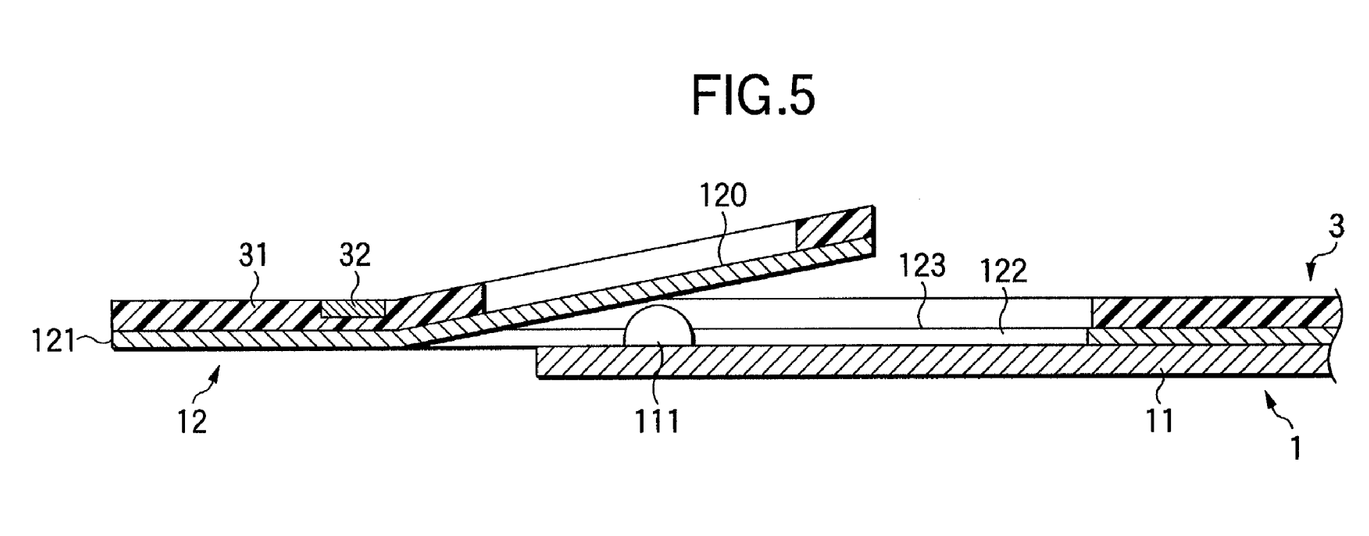
FIG. 5 is an enlarged sectional view taken along a line 5—5 of FIG. 4.

FIG. 3 through FIG. 5 are views showing steps of affixing FPC. In these drawings, the head supporting member 1 is as shown by FIG. 1 and FIG. 2, the load beam 11 is formed in the flat plate shape over its total and is not yet subjected to bending related to a stationary attitude angle. FPC3 is affixed to the head supporting member 1 in the flat plate shape.

According to the fabricating method, when affixing FPC3, the head supporting member 1 may simply be arranged horizontally. Inclined arrangement is not needed. Therefore, FPC3 can be affixed to the head supporting member 1 with high accuracy. Further, a supporting mechanism of the head supporting member 1 in affixing FPC3 can be simplified.

Further, different from the case of using the head supporting member 1 subjected to the gram load forming, it is not necessary to elongate the head supporting member 1 by exerting mechanical coercive force. Therefore, mechanical damage to the load beam 11 and the flexible member 12 can be avoided.

Further, FPC3 is affixed to the flat head supporting member 1 and therefore, performance of adhering FPC3 to the head supporting member 1 is promoted and exfoliation of FPC3 or the like is difficult to bring about.

According to FPC3, a necessary conductor wiring 32 is embedded to an inner portion of an extremely thin insulating film 31 (refer to FIG. 5). FPC3 is adhered to a side of a face of the head supporting member 1 for attaching a magnetic head by using an adhering agent 51 (refer to FIG. 3). The conductor wiring 32 is exposed to outside at both ends in a longitudinal direction of the insulating film 31, constitutes an outside connecting terminal 33 at one end side thereof and is connected to a lead-out electrode of a magnetic conversion element provided to the magnetic head at other end side thereof by means of solder ball, bonding or the like. The illustrated FPC3 is provided with a frame portion 35 overlapping the tongue-like portion 120 and a notched portion 34 for exposing a portion of the tongue-like portion 120.

The head supporting member 1 and FPC3 are provided with extremely sophisticated patterns and shapes. Therefore, when the head supporting member 1 is affixed with FPC3, it is necessary to position FPC3 relative to the head supporting member 1 with high accuracy. As means therefor, positioning by image processing is effective. Further, according to positioning by image processing, operational efficiency can be promoted. In image processing, holes or the like previously provided to the head supporting member 1 and FPC3 can be utilized.

Figure 6:
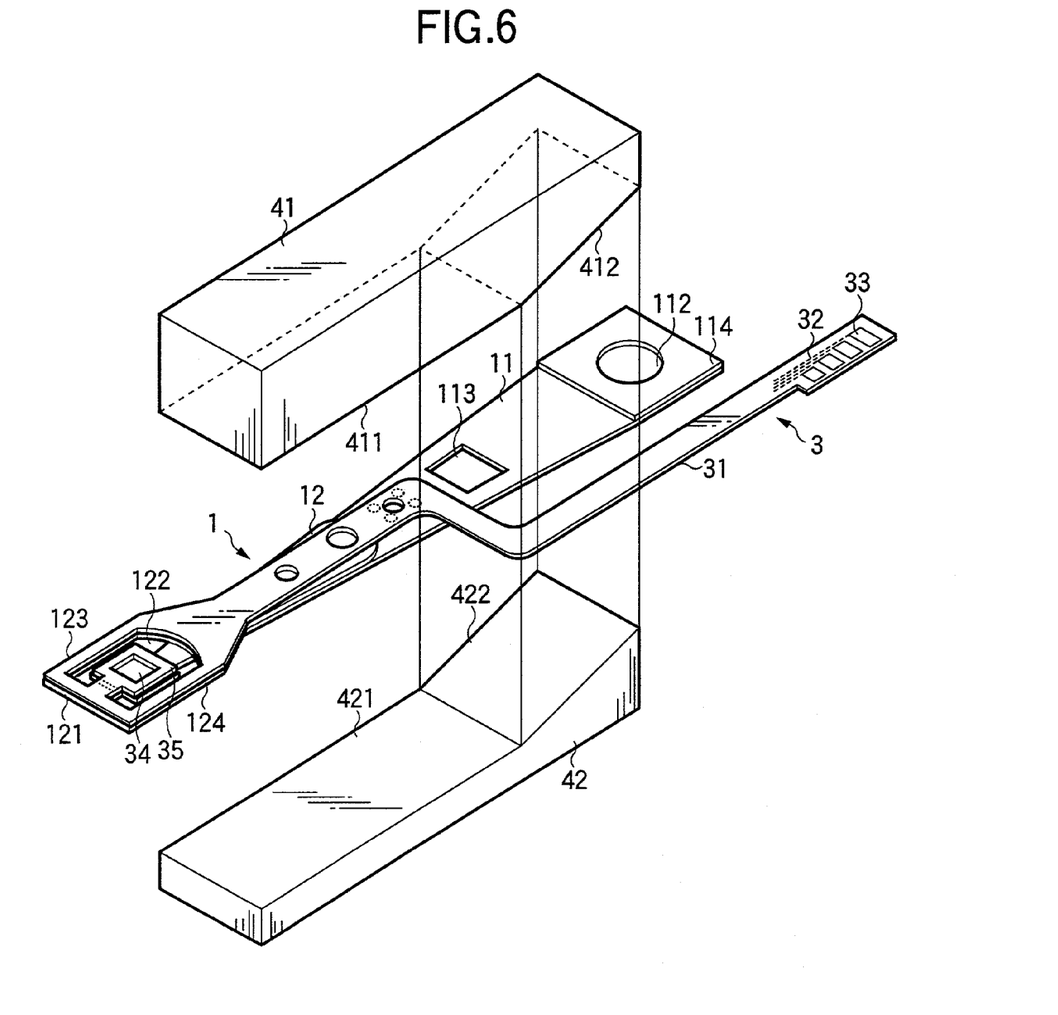
FIG. 6 is a perspective view showing a step of bending a load beam the head supporting member.
Figure 7:
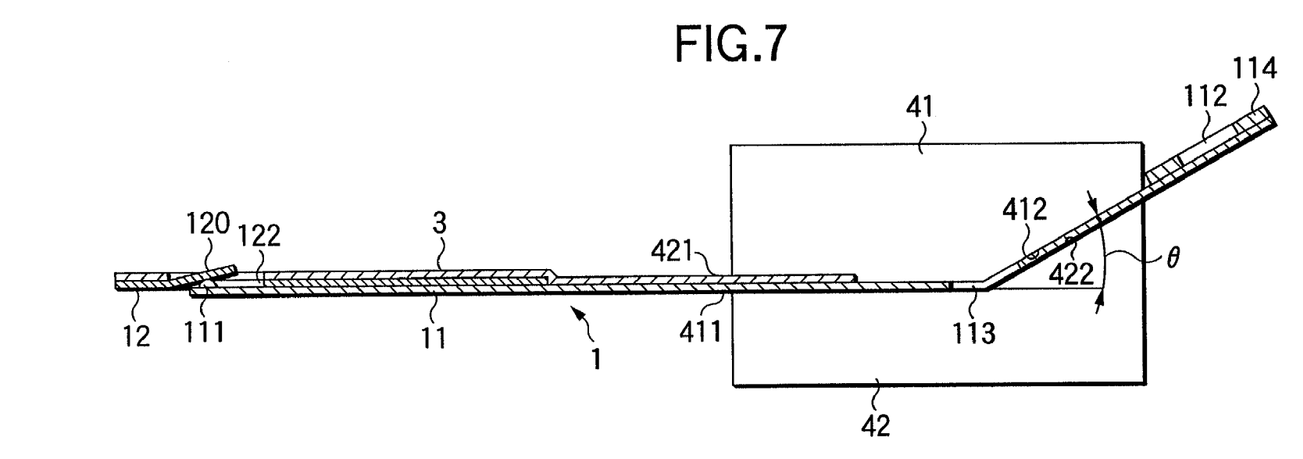
FIG. 7 is a sectional view showing the step of bending the load beam of the head supporting member.

After affixing FPC3 to the head supporting member 1 as described above, the load beam 11 is bent. FIGS. 6 and 7 show an example of bending the load beam 11. In the drawings, jigs. 41 and 42 are arranged on both sides of the load beam 11 and the load beam 11 is sandwiched to bend from both face sides thereof by the jigs 41 and 42. Explaining further in details, the jigs 41 and 42 are provided with first faces 411 and 421 and second faces 412 and 422 at faces thereof opposed to each other. Although the first faces 411 and 421 are flat faces in parallel with the load beam 11, the second faces 412 and 422 constitute faces inclined thereto.

In sandwiching the load beam 11 by the jigs 41 and 42, boundary lines of the second faces 412 and 422 constituting the inclined faces and the first faces 411 and 421, are arranged to coincide with substantially the center of the hole 113. As illustrated in FIGS. 6 and 7, when the load beam 11 is sandwiched by the jigs 41 and 42 from the both face sides, the load beam 11 is bent by an inclination angle θ of the inclined faces 412 and 422 at substantially the central portion of the hole 113. The magnitude of the bending angle θ is selected in conformity with necessary load.

Figure 8:
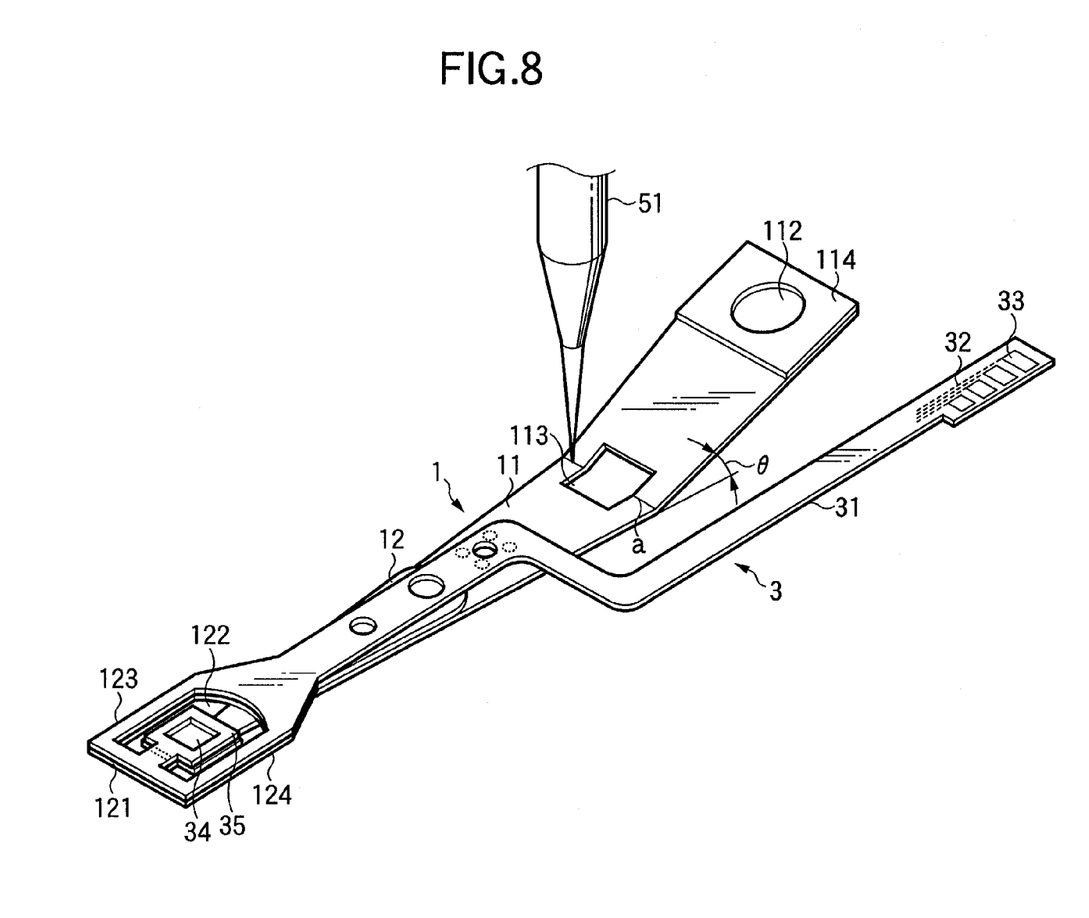
FIG. 8 is a perspective view showing a step of preventing springback after the step shown by FIGS. 6 and 7.

After bending the load beam 11, as shown by FIG. 8, a springback preventive treatment is executed. Thereby, the bending angle of the load beam 11 is not changed with aging and therefore, ageing change of load applied to the magnetic head is eliminated and the float-up amount of the magnetic head relative to the record medium such as the magnetic disk can stably be maintained to a predetermined value over a long period of time without causing ageing change.

The springback preventive treatment can include low temperature annealing or high temperature annealing treatment which does not influence on the function of FPC3. The embodiment of FIG. 8 shows an example of carrying out local high temperature annealing by irradiating laser to a limited bent portion a by laser irradiating means 51.

Figure 9:
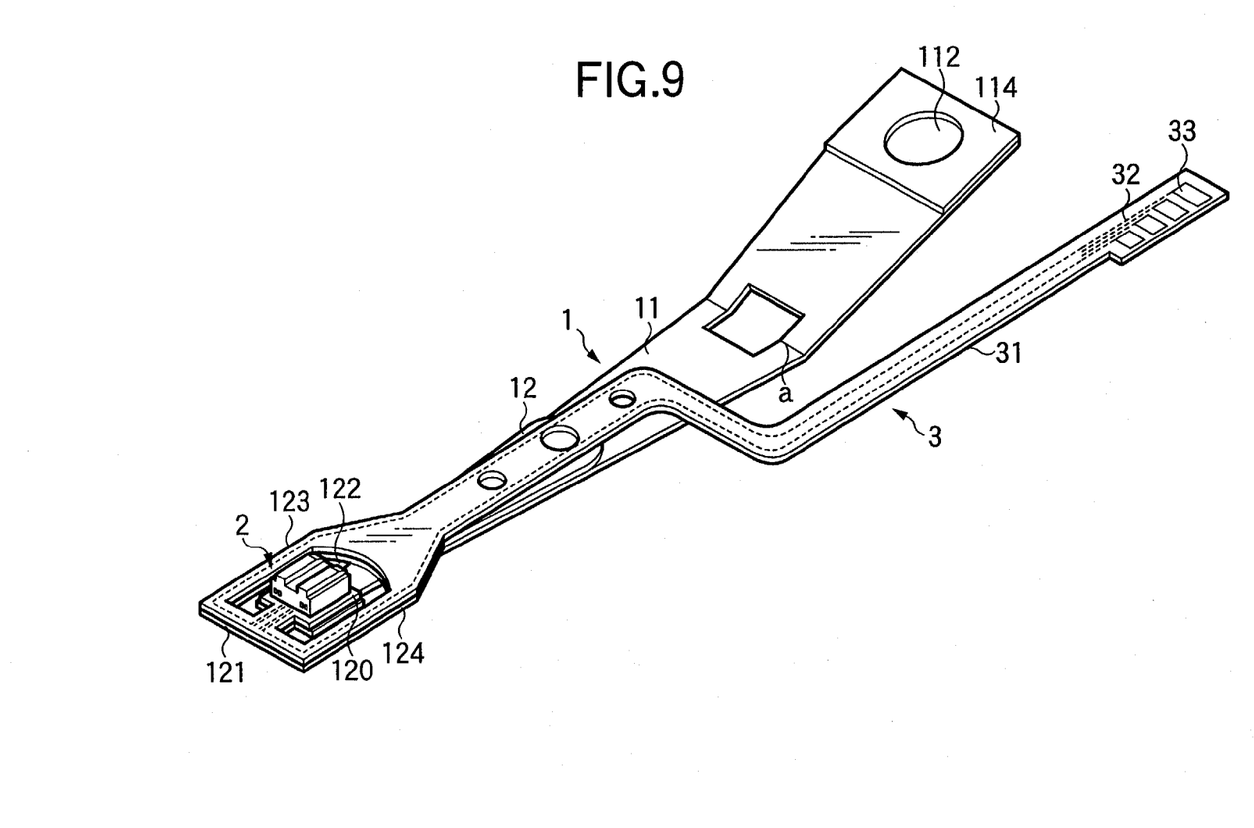
FIG. 9 is a perspective view showing a step after the step shown by FIGS. 7 and 8.

After finishing the step of affixing FPC, the step of bending the load beam and the springback preventive treatment as described above, as shown by FIG. 9, a magnetic head 2 is attached to one face of the tongue-like portion 120. A surface of the magnetic head 2 on a side opposed to a side of attaching thereof, constitutes an air bearing face. The magnetic head 2 may be mounted after affixing FPC3 to the load beam 11 and before bending the load beam 11.

As described above, according to the invention, following effects can be achieved.

There can be provided the fabricating method capable of affixing FPC to the head supporting member with high accuracy.

There can be provided the fabricating method capable of simplifying the supporting mechanism of the head supporting member in affixing FPC.

There can be provided the fabricating method capable of avoiding mechanical damage to the load beam and the flexible member.

There can be provided the fabricating method having high performance of adhering FPC to the load beam and difficult to bring about exfoliation of FPC or the like.

What is claimed is:

1. A method of fabricating a magnetic head apparatus including a head supporting member comprising:

affixing a flexible wiring on a face of the head supporting member before bending a load beam included in the head supporting member;

bending the load beam before mounting a magnetic head to an end portion of the head supporting member; and mounting the magnetic head to the end portion of the head supporting member.

2. The method as claimed in claim 1, further comprising: carrying out a springback preventive treatment after bending the load beam.

3. The method as claimed in claim 2 wherein the springback preventive treatment includes at least one of a low temperature annealing and a high temperature annealing treatment which does not influence on a function of the flexible wiring.

4. A method of fabricating a head supporting member for a magnetic head apparatus, comprising:

affixing a flexible wiring on a face of the head supporting member before bending a load beam included in the head supporting member; and bending the load beam before mounting a magnetic head to an end portion of the head supporting member.

5. The method as claimed in claim 4, further comprising: carrying out a springback preventive treatment after bending the load beam.

6. The method as claimed in claim 5 wherein the springback preventive treatment includes at least one of a low temperature annealing and a high temperature annealing treatment which does not influence on a function of the flexible wiring.

* * * * *